US007152293B2

(12) United States Patent
Abrahamson

(10) Patent No.: US 7,152,293 B2
(45) Date of Patent: Dec. 26, 2006

(54) THEE HINGE PIN REMOVER

(76) Inventor: Edward Abrahamson, 2905 Mill Run Blvd., Kissimmee, FL (US) 34744

(*) Notice: Subject to any disclaimer, the term of this patent is extended or adjusted under 35 U.S.C. 154(b) by 145 days.

(21) Appl. No.: 10/425,110

(22) Filed: Apr. 29, 2003

(65) Prior Publication Data

US 2004/0216291 A1 Nov. 4, 2004

(51) Int. Cl.
*B23P 19/04* (2006.01)
*B25B 27/14* (2006.01)

(52) U.S. Cl. .............................. 29/244; 29/275; 29/278

(58) Field of Classification Search ................... 29/244, 29/255, 259, 267, 278, 280, 282; 254/97, 254/275
See application file for complete search history.

(56) References Cited

U.S. PATENT DOCUMENTS 4,293,992 A * 10/1981 Webb .......................... 29/267
4,354,375 A * 10/1982 Lesowsky .................... 72/449
4,848,735 A * 7/1989 Pittman ...................... 254/420
5,875,535 A * 3/1999 Canoy ......................... 29/275
6,351,881 B1 * 3/2002 Peckich et al. ............... 29/275

* cited by examiner

*Primary Examiner*—Lee D. Wilson

(57) ABSTRACT

This is a device use for removing a hinge pin from its hinge assembly safely, quickly, and easily, using lever action instead of the traditional hammering or banging. This device is placed over the top of the door hinge, where it rests by grabbing the head of the hinge pin. It has a handle that is attached to a gear wheel, which rotates on a shaft, when the handle is moved up and down. It has an L shaped arm that has a thin rod attached to it lower part. The L shaped arm has teeth on it backside, which interlocks with the gear wheel. When the handle is pulled sown, the gear wheel rotates and raised the L shaped arm. This raises the thin rod that is attached to the L shaped arm, which in turn pushes up against the bottom of the hinge pin, thus raising the hinge pin up and out of the door hinge assembly.

4 Claims, 5 Drawing Sheets

THEE HINGE PIN REMOVER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention, referred to as Thee Hinge Pin Remover, provides a safer, faster, and easier way to remove the hinge pins out of their hinge assemblies, in order to remove a door from its frame.

Doors often have to be removed for many reasons. Whether it is to make the doorway wider for moving larger pieces of furniture or items through, or because they are simply in the way of performing various tasks such as carpeting, tiling, wallpaper hanging, painting, door replacement, remodeling, renovations, etc.

The people who have to remove doors include movers, carpenters, vinyl and tile installers, carpet layers, floor refinishers, wallpaper hangers, painters, remodelers, renovators, appliance dealers, and also home owners.

Typically, the door is connected to its frame by a door hinge. The hinge is made up of two mating pieces of which one piece is attached to the door and the other piece is attached to the door frame. The two hinge pieces then interlock together by a cylindrical channel that receives a hinge pin.

The most common way to remove the door, is to pull the hinge pins out of the door hinge assemblies. Once the pins are removed, the two hinge pieces will separate, and the door can be removed from its door frame.

The most common way to remove these hinge pins, is to bang them out from the bottom, using a hammer and some type of punching tool such as a screwdriver. In doing it this way, it is quite common to either injure your hands, or do damage to the floor, the paint or finish of the metal and woodwork surrounding the door, the hinge, the hinge pin, or the tools being used to do so.

What usually causes this damage is a miss of a swing from the hammer, or the punching tool that slips out of place while being struck by the hammer. Even when performed properly, it can still be a difficult job. Another problem, is that the bottom hinge on a door is usually too close to the floor to get a proper swing from the hammer, thus adding to the difficulty.

There are many different variations of tools made for performing this task, but all function basically the same. They require banging out using a hammer and punch like tool, or need to be pried out using a crow bar type tool.

This is why there is a need for Thee Hinge Pin Remover. Thee Hinge Pin Remover provides a safer, faster and easier way to remove a hinge pin out of its door hinge assembly. Thee Hinge Pin Remover uses a lever action to do so, thus eliminating the need for hammering or banging. Using Thee Hinge Pin Remover to perform this task will greatly reduce, if not eliminate, doing any injury to your hands or damage to the floor, the paint or finish of the metal and woodwork surrounding the door, the hinge, the hinge pin, or the tools being used to do so.

SUMMARY

Thee Hinge Pin Remover of preferred embodiment preferably consists of two side panels connected by a piece of notched out square tubular housing. The piece of square tubular housing is notched out, in order to fit comfortably over and around the top of the door hinge and pin. The two side panels that run parallel to each other, both having holes in the center that act as a guide for a shaft that runs through them.

In between the two side panels, on the shaft, there is a gear wheel. The gear wheel has a handle attached to it in order to operate this device. The handle moves in an up and down position, which turns the gear back and fourth There is an L shaped arm that on its back side, contains teeth that interlock with the gear wheel. The gear wheel, the two side panels, and the back side of the square tubular housing, all act as guides for this arm to move up and down freely. On the lower part of the L shaped arm, there is a thin rod attached. This rod is the part that pushes up against the bottom of the hinge pin until the pin is pushed up and out of its hinge assembly.

To operate this device, you simply place it over the top of the door hinge where the housing wraps around the head of the hinge pin. Then you puff down on the handle. Pulling down on the handle turns the gear wheel, which raises the L shaped arm. The rod that is attached to the lower part of the L shaped arm raises with it and against the bottom of the hinge pin, thus pushing the hinge pin up and out of its hinge assembly.

Using this lever action hinge pin remover takes away the need for any banging with a hammer and punch like tool. Thus greatly reduces, if not eliminates, the chances of causing injury or damage. It also makes the task much safer, faster and easier.

DETAILED DESCRIPTION OF THE INVENTION

Figure 1:
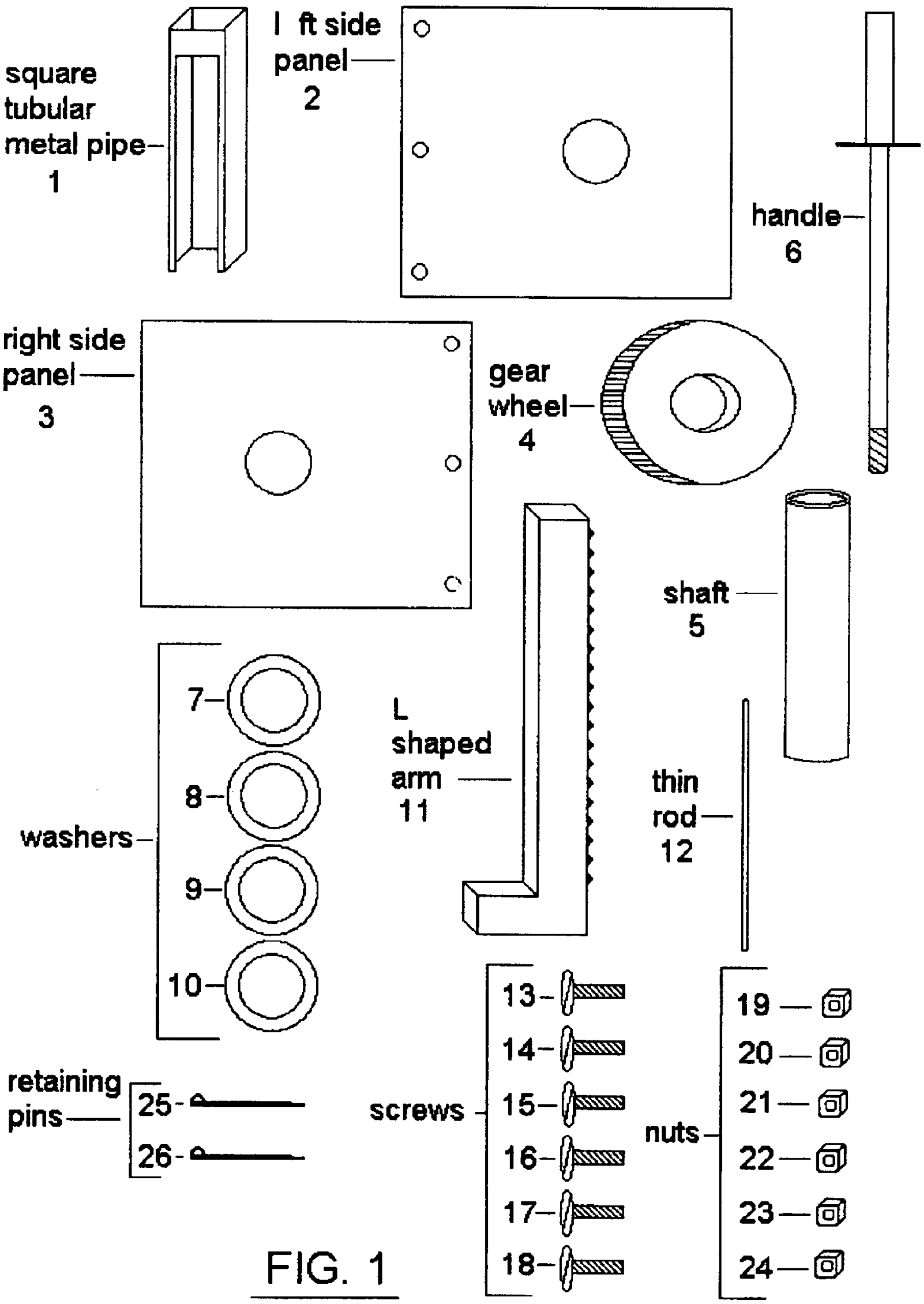
FIG. 1 shows a list of parts that make up Thee Hinge Pin Remover.
Figure 2:
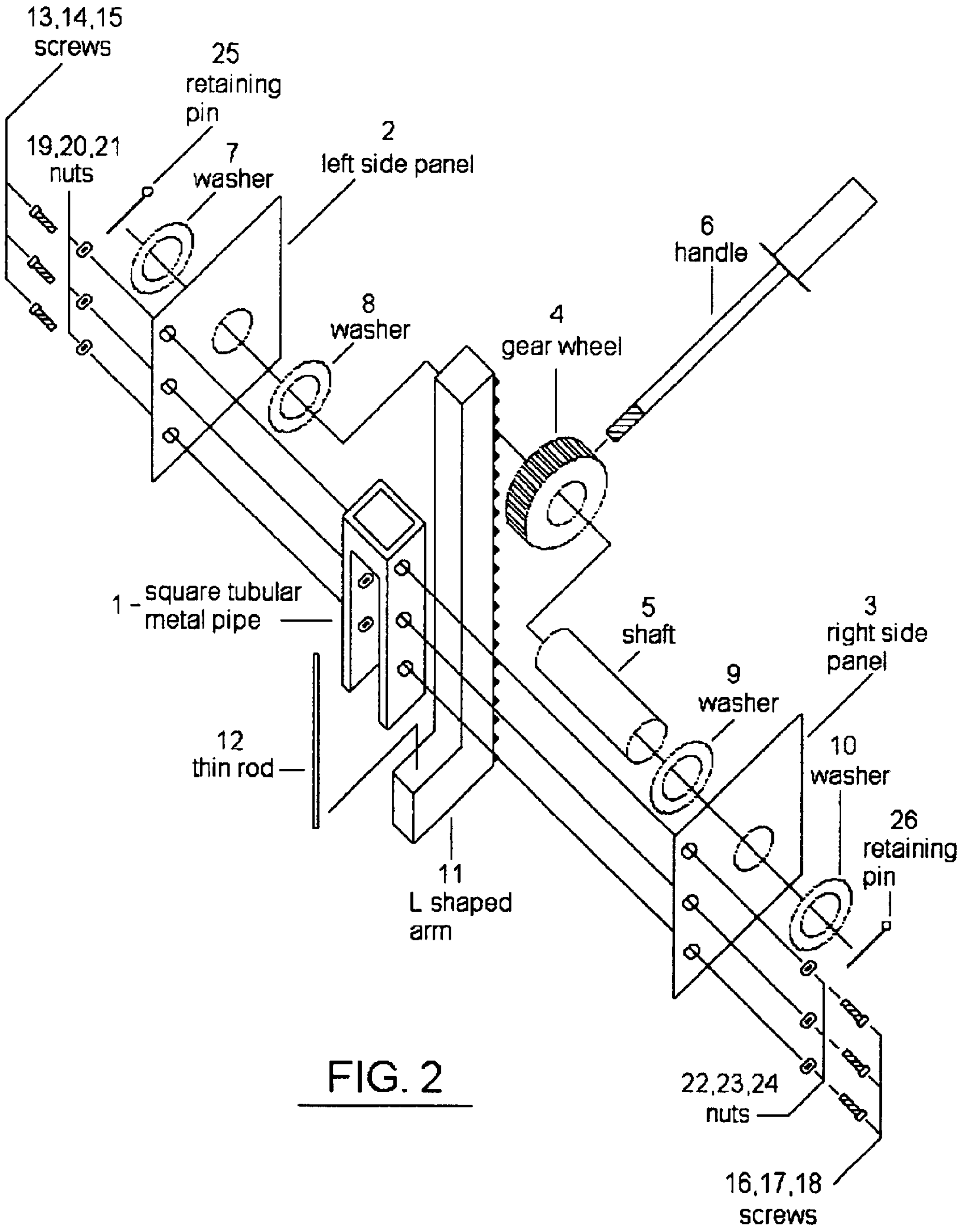
FIG. 2 shows the parts, and how they assemble together, in an exploded view, that makes up The Hinge Pin Remover.
Figure 3:
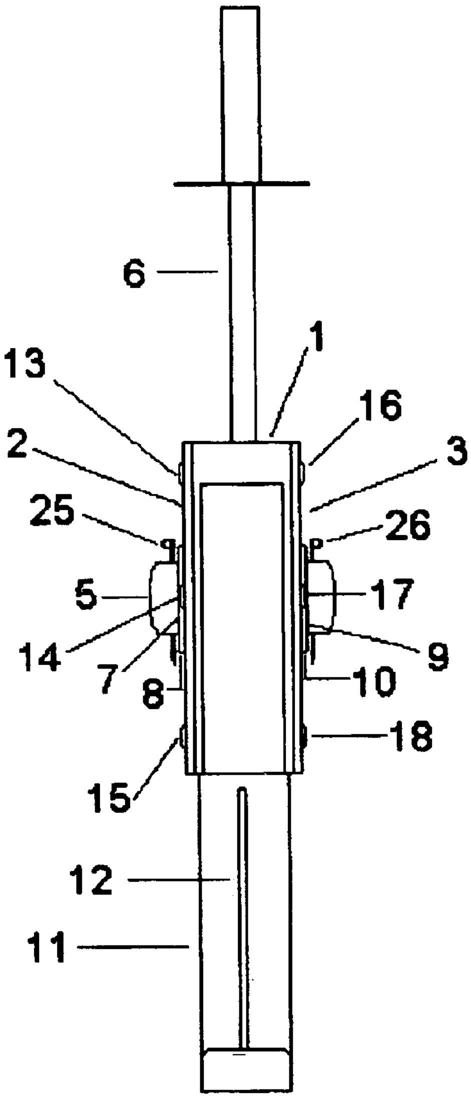
FIG. 3 shows the front side of Thee Hinge Pin Remover. This is the side that is placed over, and rests on the top of the door hinge by grabbing the top of the hinge pin.

Reference will now be made to the drawings wherein like numerals refer to like parts throughout. FIG. 1 is a parts list that makes up our working prototype. FIG. 2 shows the parts that make up Thee Hinge Pin Remover, in the preferred embodiment, in an exploded view. The square tubular housing (1) is notched out in order to fit on top of and over, the doors hinge (27) and hinge pin (28). FIG. 3 better shows the view in which the notched out front side of the square tubular housing (1) accommodates the doors hinge (27).

The left side panel (2) and the right side panel (3) run parallel to one another, both having holes in the centers, that work as a guide for the shaft (5) that runs through them. The left side panel (2) is fastened to the left side of the square tubular housing (1) using three screws (13), (14), & (15) and three nuts (19), (20), & (21). The right side panel (3) is fastened to the right side of the square tubular housing (1) using three screws (16), (17) & (18) and three nuts (22), (23), & (24). On the center of the shaft (5), in between the two side panels, is a gear wheel (4). Attached to the gear wheel (4) is a handle (6), that when pulled up or down, rotates the gear wheel (4).

There are two washers (7) & (8) that the shaft (5) passes through, that are on both sides of the gear wheel (4), in between the two side panels (2) & (3). This provides smoother action when the gear wheel (4) is turned. There are also two additional washers (9) & (10) that the shaft (5) passes through, that are on the outsides of the two panels (2) & (3). This also provides smoother action when the gear wheel (4) is turned. There are two retaining pins (25) & (26) that are fastened on both ends of the shaft (5) that helps hold this device together.

There is an L shaped arm (11), that on its backside, contains teeth that interlock with the gear wheel (4). The gear wheel (4), the two side panels (2) & (3), along with the back side of the square tubular housing (1), all act as guides for all four sides of this L shaped arm (11) to move up and down freely.

Finally, there is a thin rod (12) that is attached to the lower part of the L shaped arm (11). This rod (12) is the part that pushes the hinge pin (28) up and out of its hinge assembly (27). To operate Thee Hinge Pin Remover, you simply place it over the top of the door hinge (27) and pull down on the handle (6). While pulling down on the handle (6), this turns the gear wheel (4), which raises the L shaped arm (11). The thin rod (12) that is attached to the lower part of the L shaped arm (11) raises with it, when the handle (6) is being pulled downward. This thin rod (12) then pushes against the bottom of the hinge pin (28), thus removing the hinge pin (28) up and out of the hinge assembly (27).

Figure 4:
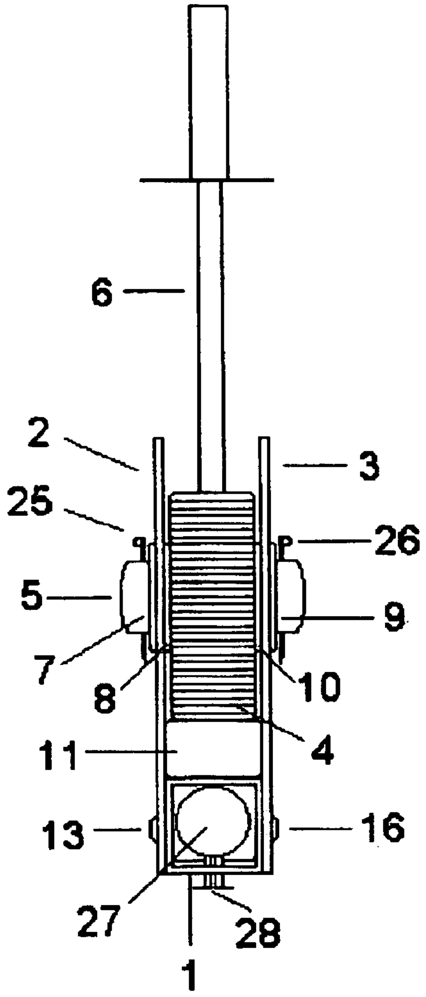
FIG. 4 shows the top view, looking down, of Thee Hinge Pin Remover after it has been placed over the hinge assembly. The circle represents the top view of the hinge pin, which provides a grab spot for the hinge pin remover. This enables the hinge pin remover to sit on the hinge on its own.

FIG. 4 shows the top view, looking down, of Thee Hinge Pin Remover once in place resting over the door hinge (27). The circle represents the top view of the hinge pin (28), which also provides stability and enables the hinge pin remover to sit on the door hinge on its own.

Figure 5:
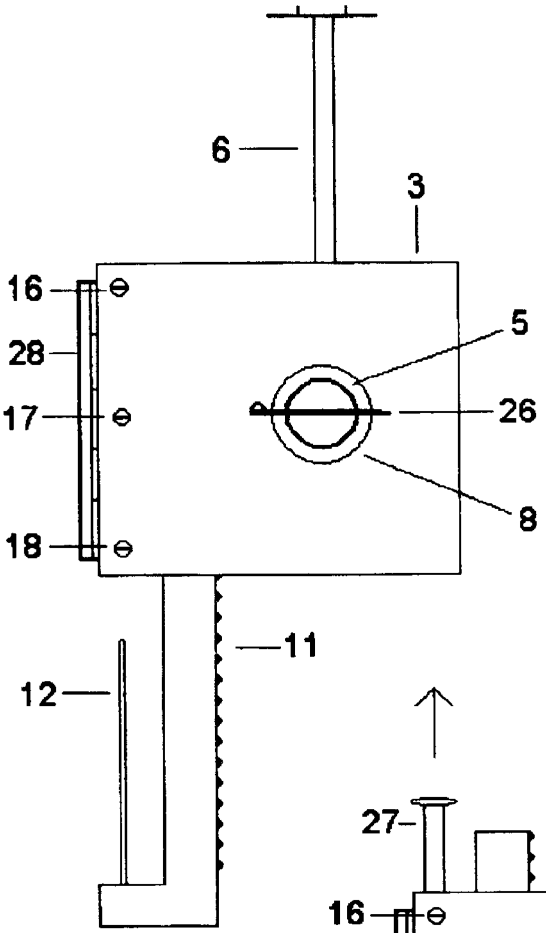
FIG. 5 shows Thee Hinge Pin Remover, in the upright position, after being placed over the door hinge.

FIG. 5 shows Thee Hinge Pin Remover in the upright position after it has been placed over the door hinge (27). Notice the handle (6) is in the upright position, and the L shaped arm (11), with the thin rod (12) attached, in the down position.

Figure 6:
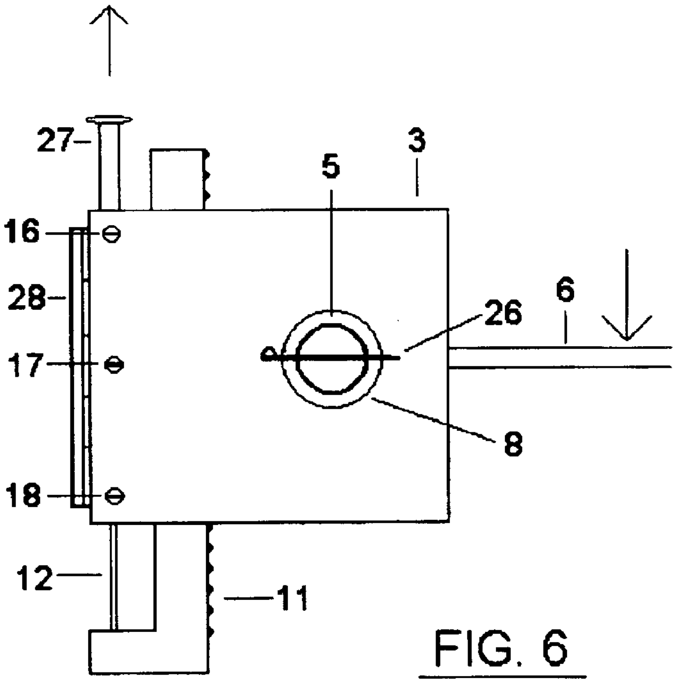
FIG. 6 shows The Hinge Pin Remover, after the handle has been pulled halfway down, halfway through the process of pushing the hinge pin up out of the hinge assembly.

FIG. 6 shows what The Hinge Pin Remover looks like, halfway through its cycle. Notice that the handle (6) is in the halfway down position. This means the gear wheel (4) has been rotated halfway, thus raising the L shaped arm (11) with the attached thin rod (12), halfway as well. Notice at this point, the thin rod (12) has already pushed the pin (28) halfway out of the hinge pin assembly (27).

Figure 7:
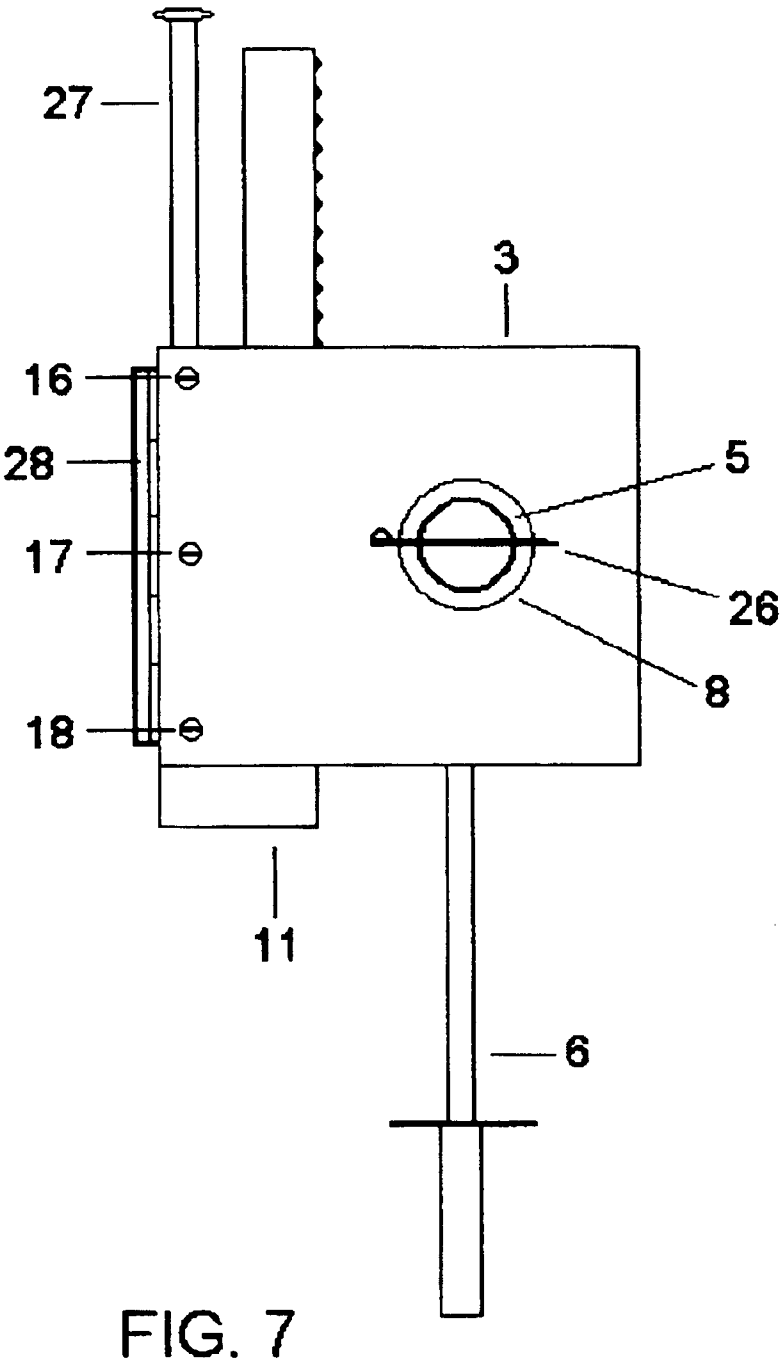
FIG. 7 shows Thee Hinge Pin Remover after the handle has been pulled completely down, having raised the arm and pushing out the hinge pin.

FIG. 7 shows The Hinge Pin Remover, after the handle (6) has been pulled all the way down, completing its cycle. The gear wheel (4) has rotated the remaining distance, thus raising the L shaped arm (11) along with its attached thin rod (12), the rest of the way up. Notice at this completed point, the hinge pin (28) has been removed from its assembly (27).

What I claim as my invention is:

1. An apparatus for urging a hinge pin in an upwardly direction within a hinge, the apparatus comprising:

an L-shaped arm comprising a base portion and a set of teeth formed along a length of one side;

a pair of spaced apart and substantially parallel side panels each having a respective aperture formed proximate a center portion thereof;

a tubular housing affixed between the side panels, the tubular housing having an upper end for fitting over and resting on an upper end of the hinge and a notched out front portion for substantially encasing at least a portion of the hinge when the apparatus is in position for urging the hinge pin upwardly;

a toothed gear wheel rotatably mounted on a shaft between the pair of side panels so that the toothed gear wheel operatively engages the teeth of the L-shaped arm;

a handle affixed at a first end to the toothed gear wheel; and a rod affixed to the base portion of the L-shaped arm so that the rod is generally aligned with the hinge pin when the apparatus is in position for urging the hinge pin upwardly whereby rotation of the handle causes the rod to contact the hinge pin and urge the hinge pin upwardly.

2. An apparatus for urging a hinge pin upwardly within a hinge, the apparatus comprising:

a main body;

a housing extending along a length of and recessed from a lateral edge of the main body;

a flange proximate a first end of the housing;

an arm movable with respect to the housing;

a rod affixed to and spaced from the arm; and means for longitudinally translating the arm substantially parallel to the housing so that the rod urges the hinge pin upwardly.

3. The apparatus of claim 2, the means for longitudinally translating the arm substantially parallel to the housing comprising:

a set of teeth disposed on a first side of the arm;

a toothed gear wheel rotatably mounted within the main body that operatively engages the set of teeth disposed on the arm; and a handle affixed at a first end to the toothed gear wheel for rotating the toothed gear wheel between a first position and a second position.

4. A method for urging a hinge pin upwardly within a hinge, the method comprising:

positioning an apparatus in a fixed relation to the hinge so that a rod is generally aligned with a bottom of the hinge pin; and generating a leveraging force by moving a handle of the apparatus in a direction opposite to a direction of movement of the rod whereby the rod contacts the bottom of the hinge pin and urges the hinge pin upwardly within the hinge in response to the leveraging force.

* * * * *